(12) United States Patent
Neidig

(10) Patent No.: US 10,359,768 B2
(45) Date of Patent: Jul. 23, 2019

(54) METHOD AND APPARATUS FOR THE AUTOMATED DETERMINATION OF AN ACTION REGION FOR AN EMERGENCY STOP ACTUATION DEVICE IN AN INDUSTRIAL PLANT

(71) Applicant: Siemens Aktiengesellschaft, München (DE)

(72) Inventor: Jörg Neidig, Nürnberg (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 351 days.

(21) Appl. No.: 15/238,303

(22) Filed: Aug. 16, 2016

(65) Prior Publication Data
US 2017/0052535 A1 Feb. 23, 2017

(30) Foreign Application Priority Data
Aug. 17, 2015 (EP) ..................................... 15181199

(51) Int. Cl.
*G05B 19/18* (2006.01)
*G05B 19/418* (2006.01)
*G06T 19/00* (2011.01)

(52) U.S. Cl.
CPC ....... *G05B 19/41885* (2013.01); *G05B 19/18* (2013.01); *G06T 19/00* (2013.01); *G05B 2219/24003* (2013.01); *G05B 2219/42155* (2013.01); *G05B 2219/50193* (2013.01); *Y02P 90/20* (2015.11); *Y02P 90/26* (2015.11)

(58) Field of Classification Search
None
See application file for complete search history.

(56) References Cited

U.S. PATENT DOCUMENTS

2014/0277613 A1* 9/2014 Love ........................ A63J 1/02
700/83
2015/0032293 A1 1/2015 Bivans

FOREIGN PATENT DOCUMENTS

EP 2020626 A1 2/2009

* cited by examiner

*Primary Examiner* — Cory W Eskridge
(74) *Attorney, Agent, or Firm* — Henry M. Feiereisen, LLC

(57) ABSTRACT

Method and apparatus for the automated determination of an effective area for an emergency stop device(s) in an industrial plant is provided. In modern flexible installations, as will be increasingly found, (such as cyberphysical systems), the layout of the plant will be dynamically changeable. In such an environment, it is often impossible to manually prepare complete safety plan in advance for each potential environment. The proposed methods and apparatuses allow automatic calculations of operational configurations and effective regions of emergency stop devices in an industrial plant, allowing easy positioning of such devices. An improved method for recalculating the effective region after the layout of the plant or portions thereof changed is also provided.

20 Claims, 6 Drawing Sheets

METHOD AND APPARATUS FOR THE AUTOMATED DETERMINATION OF AN ACTION REGION FOR AN EMERGENCY STOP ACTUATION DEVICE IN AN INDUSTRIAL PLANT

CROSS-REFERENCES TO RELATED APPLICATIONS

This application claims the priority of European Patent Application, Serial No. 15181199.9, filed Aug. 17, 2015, pursuant to 35 U.S.C. 119(a)-(d), the disclosure of which is incorporated herein by reference in its entirety as if fully set forth herein.

BACKGROUND OF THE INVENTION

The present invention relates to a method and apparatus for the automated determination of an action region for an emergency stop actuation device in an industrial plant.

The following discussion of related art is provided to assist the reader in understanding the advantages of the invention, and is not to be construed as an admission that this related art is prior art to this invention.

An "emergency stop" is an important and prescribed safety requirement in technical installations. A distinction is generally made between the emergency stop, which stops a plant component and therefore prevents a dangerous movement, and the emergency switching-off, which switches off the plant component, or, stated differently disconnects the plant component from the voltage supply, and therefore prevents risks caused by electrical voltages in the plant. The following description will refer only to the emergency stop which involves stopping a movement as quickly as possible.

The requirements for the emergency stop are standardized in various international standards. There are the requirements according to DIN EN ISO 13850, "Safety of machinery—Emergency stop function—Principles for design", which also specifies, for example, the form, color, operability and fitting of actuation devices or command devices for the emergency stop, for example as a pushbutton, a handle or a switch.

Yet another relevant standard to the topic is DIN EN 60204-1 with the title "Safety of machinery—Electrical equipment of machines, is directed towards avoiding dangerous situations and their risks and to take into account safety measures during design. In addition, maintenance and repair measures, as well as improved machine reliability and ease of operation are considered.

The abovementioned standards require that the emergency stop actuation devices are easily and quickly reached. Furthermore, prerequisite for these actuation devices are sufficient number of them, that danger points are clear from their actuation location and the assignment of an associated section to the actuation device is clear.

While the present invention may be applicable to emergency stopping of any process, device and machine in the plant, for brevity, the following specifications would exchangably relate to such plant components generically as 'machines'. Similarly, while an emergency stop activation device may take the form of a button, a handle, a software, a transmitter or any other form of a control, for brevity the present specifications shall use the term 'button' as exchangeable with the term activation device, for all such devices.

An important requirement is therefore that the activation of the emergency stop button clearly handles the safety situation. Thus, which device and/or machine is stopped by the respective button is desirably intuitively clear. If it is not possible to perceive any clear boundary of the machine (for example by suitable marking), it is expected that all safety-relevant situations in the direct field of view of the person triggering the emergency button will be handled. Further desirably, the actuation of the emergency button would not have any further, potentially negative effects on machines in the plant which are not in the person's field of view.

The operating region of the actuation device will be referred to below and denotes the set of locations in the plant which are allocated to a particular actuation device and for which the conditions described above apply. Stated differently, an operating region relates to a region from which the actuation device may be securely activated.

Presently, an appropriate safety plan for implementing the requirements predefined by a relevant standard in a plant is produced only after the layout of the installation and machines has been definitively stipulated. Stated differently, such plan is produced after the information relating to the local positioning of the plant components in the plant, and the operative relationships between the individual plant components are known. This plan has hitherto generally been produced manually. The plan produced in this manner is then fixed and documented.

In modern flexible plants, as will be found more and more often in future in particular (cyberphysical systems, industry 4.0 initiative), the layout of the plant is intended to be dynamically changeable in a manner adapted to the utilization of the plant, the product currently being produced or other factors. In such an environment, it is often impossible or impractical to prepare the complete required safety plan in advance.

The problem is intensified even further by the use of decentralized structures, for example when each individual machine is treated as a cyberphysical system, or stated differently as a combination of IT, software components with mechanical and electronic parts which communicate via a data infrastructure, for example the Internet. A cyberphysical system is characterized by its high degree of complexity. Cyberphysical systems are formed by networking embedded systems via wired or wireless communication links. In such an environment, it is very challenging to create a safety plan in advance. This problem is further intensified in a decentralized environment, for example when each machine is treated as a cyberphysical system with only limited knowledge of the respective context in which it operates.

Certain production facilities or factories have a set of interacting, partially autonomous machines. In a modern production facility, these machines are intended to be dynamically arranged; in particular, it is possible to occasionally change the respective local region in which the machine is used. It is therefore very advantageous to minimize the engineering complexity of conversion to such a new arrangement and, in particular, to avoid the need for manual planning.

It would therefore be desirable and advantageous to provide an improved method and apparatus to obviate prior art shortcomings and to enable automatic calculation of an effective region for an actuation device (equivalently referred to as emergency stop button or emergency stop device). It would also be desirable and advantageous to provide an improved plant capable of automatically determining at least one effective region of an emergency stop device, and in certain embodiments thereof, to form a safety plan for the plant or portions thereof, from a plurality of automatically determined effective regions. Optionally, a safety plan or the effective region(s) may be manually edited.

SUMMARY OF THE INVENTION

According to one aspect of the present invention, a method for determining an effective visible region for an emergency stop device disposed in an industrial plant having a plurality of operatively coupled individual machines spatially distributed in the plant, includes utilizing a three-dimensional plant model modeling the plant or a portion thereof, and a plurality of three-dimensional machine models modeling the outer boundaries for a respective machine of the plurality of machines, with the method including
 a) determining an operating region for the emergency stop device,
 b) selecting a current potential viewpoint inside the operating region,
 c) utilizing a visibility determination algorithm, the plant model and at least one of the plurality of machine models, and information relating to the disposition of the machines within the plant, determining a set of machines visible from the current potential viewpoint,
 d) when a sufficient number of viewpoints have been considered by step c) in order to obtain sufficient visibility of the machines in accordance with pre-defined criteria, then continuing with step f), and otherwise determining a subsequent viewpoint inside the operating region,
 e) executing steps c) and d) with the subsequent viewpoint being used as the current potential viewpoint,
 f) determining which machines are visible from the operating region by evaluating the results from step c), and setting the effective region to those machines.

According to another advantageous feature of the present invention, relevant locations can be determined for installing an actuation device for effecting an emergency stop on at least one of the individual machines.

According to another advantageous feature of the present invention, at least one of the machines can contain information relating to transitioning thereof to an emergency stop state. The information contained in the machine may, by way of example, be selected from energy required to transition the machine to an emergency stop state, potential movement of the machine during such transition, at least one function permitting such transition, or any combination thereof.

According to another advantageous feature of the present invention, the visibility determination algorithm can include ray casting algorithm, and or ray tracing algorithm.

Some of the emergency stop device may be directly coupled to a machine, however this is not mandatory, and in other embodiments at east one emergency stop device is disposed within the operation region away from the machine.

According to another advantageous feature of the present invention, an effective region for a plurality of emergency stop devices can be determined, and the plurality of resulting effective regions can be combined into a plant safety plan. Optionally, the plant safety plan is utilized to automatically configure an automatic event handler handling at least responses to activation of an emergency stop device. Advantageously, the plant safety plan can be manually editable, and the result of the edited plan can be the ones utilized to automatically configure the event handler.

According to another advantageous feature of the present invention, faster computation can be allowed, when a single machine disposition is changed within the plant during or after execution of any of steps a)-f). As a result, the safety plan can be adjusted by calculating first the effective region of the changed machine, determining required recalculations for any of the effective regions, and recalculating only the required effective regions. Advantageously, the calculation the effective region of the changed machine can utilize a ray tracing or ray casting algorithm, the rays being cast or traced from the changed machine towards the operating region or a portion thereof.

According to another advantageous feature of the present invention, at least one of steps a)-f) can be performed in a central superordinate computing entity of the industrial plant. As an alternative, at least one of steps a)-f) can be executed in a distributed fashion by at least two of the plurality of machines, with information relating to the visibility of at least one machine from the viewpoint, being exchanged between at least two machines. By way of example, the information relating to the visibility of at least one machine is exchanged with a computing entity outside any of the plurality of machines.

According to another aspect of the present invention, an industrial plant includes a plurality of operatively coupled individual machines spatially distributed in the plant, a plurality of emergency stop devices, a data memory having at least a three-dimensional plant model modeling the plant or a portion thereof, and a plurality of three-dimensional machine models modeling the outer boundaries for a respective machine of the plurality of machines stored therein. A computing entity is also provided, the computing entity having access to the memory, and configured to determine an effective region for at least one of the plurality of emergency stop device by any of the methods disclosed herein for determining the effective region of at least one of the plurality of the emergency stop buttons.

According to another advantageous feature of the present invention, the computing entity can be distributed between at least two sub-entities, with at least one of the sub-entities being one of the plurality of machines.

According to another advantageous feature of the present invention, the computing entity can be configured to determine a safety plan by combining information of a plurality of effective regions.

According to yet another aspect of the present invention, an apparatus for determining an effective region of an emergency stop button in a plant having a plurality of operatively coupled individual machines spatially distributed in the plant, and a plurality of emergency stop devices, includes a data memory having at least a three-dimensional plant model modeling the plant or a portion thereof, and a plurality of three-dimensional machine models modeling the outer boundaries for a respective machine of the plurality of machines stored therein, and a computing entity having access to the memory, and configured execute at least one of the methods disclosed herein for determining an effective region for at least one of the plurality of the emergency stopping devices.

Certain machine potentially require auxiliary mechanisms and apparatuses to transition to the safe state, for example requirements imposed by air pressure, power requirement or the like.

A three-dimensional (3D) model of the contour or outlines is created for each machine. It is sufficient to produce a static model and it is likewise not necessary to simulate all the possible movements of the machine in the model. However portions of the machine which allow visibility there through, such as cutouts and transparent portions, are important and are also modeled in the machine model.

A model of the plant space in which the machines are situated is also required. Like in the model of the machine, information relating to circumstances which obstruct the view inside the space, for example columns, corners or walls, is important and modeled. It is also advantageous when the respective machine has information relating to its own location and/or orientation inside the plant, however this information may be considered otherwise.

According to another advantageous feature of the present invention, each machine can have access to its own 3D model and also can have sufficient computing capacity in order to locally carry out necessary calculations. In this case, it should be noted that the machine can only carry out a calculation related to the environment known to it. For a decentralized solution, it is also necessary for the relevant plant section to be able to communicate with other plant sections in order to interchange intermediate results and results from the respective calculations.

For the calculations, it is also assumed that a potential user of an emergency stop button is in a nearby environment of the respective button (the operating region), from which the affected machine(s) must be at least partially visible.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
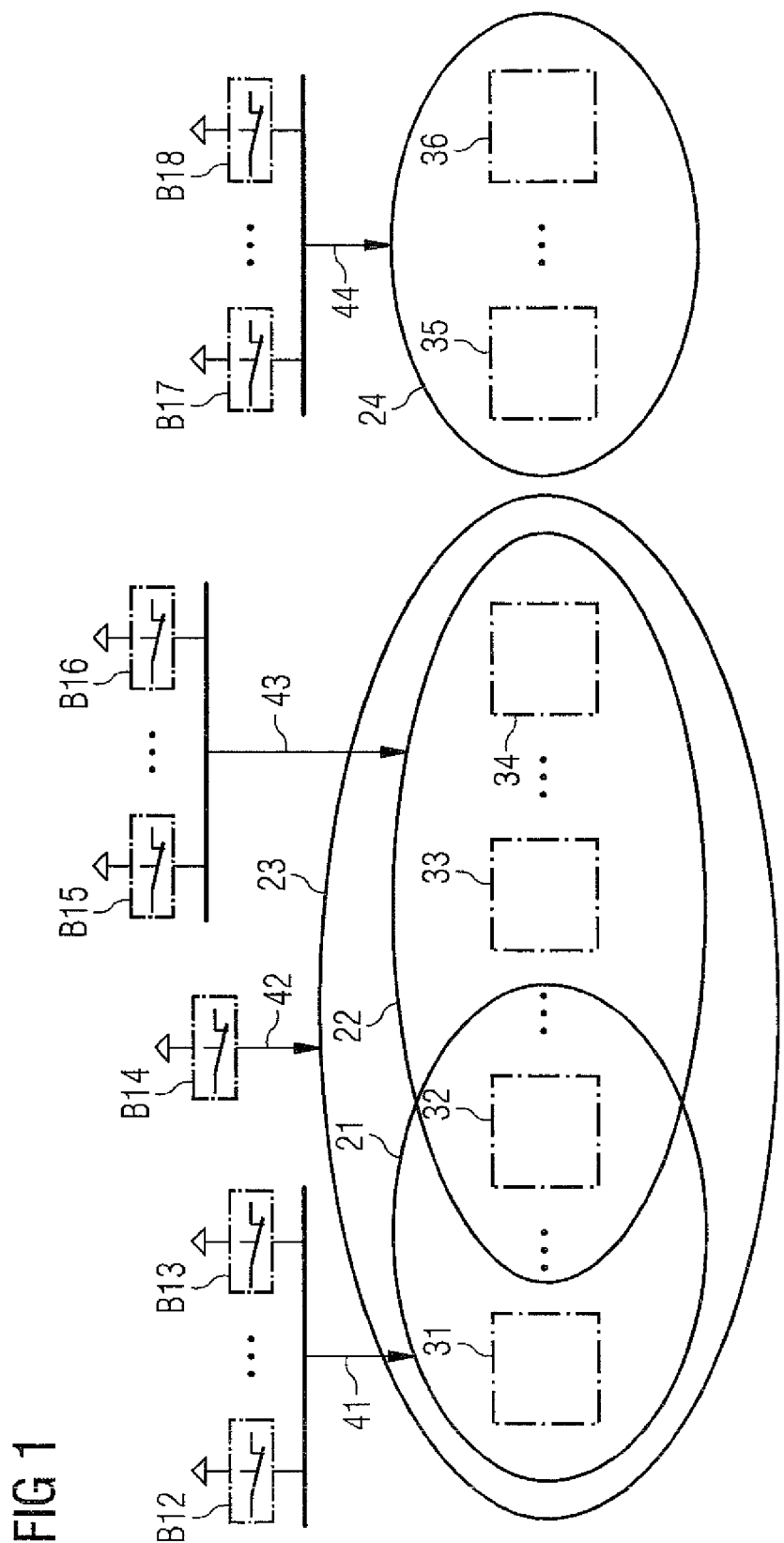
FIG. 1 shows an example of a model of the plant components and effective regions.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

The methods and other aspects advantageously enable determining an effective region for an emergency stop button in an automated manner. The term "effective region" is hereby to be understood as relating to the part of the plant, and plant components therein, that can be stopped by the respective emergency stop button in the event of an emergency. The part of the plant may relate to individual machines or a set of machines or devices. When more than one emergency stop button is used in plant, it is also possible for the respective effective regions of the individual emergency stop buttons to overlap, or stated differently, one machine may be stopped by two or more different emergency stop buttons. This is schematically illustrated in FIG. 1. The emergency stop buttons B12 . . . B18 affect the machines 31 . . . 36 in the respective effective regions 21 . . . 24. In this case, machines 31, 33, 34 are in two effective areas and machine 32 is in three effective areas. It is likewise possible for a plurality of emergency stop buttons B12 . . . B13 to act on the same effective area.

In a plant depicted in FIG. 1, the emergency stop button causes the machines in the respective effective area to transition to a safe status (for example according to the abovementioned standards) immediately and without further intervention by operating personnel.

Figure 2:
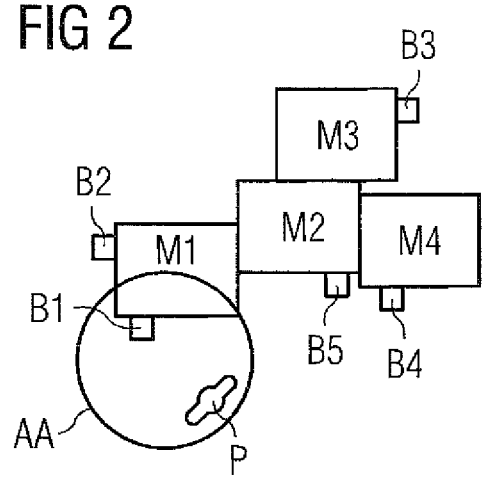
FIG. 2 shows an exemplary arrangement of a plant region having four machines.

FIG. 2 shows an arrangement of machines M1, . . . M4 forming a plant section. An operator P has an action radius which describes his operating region AA. Criteria for determining the operating region may be defined by designed parameters, a relevant standard or regulation, postulating human reach for the relevant emergency button and reaction considerations such as reaction time and the like, or otherwise arbitrarily determined. The individual machines are equipped with the necessary emergency stop buttons B1 to B5, preferably according to the standard. It is important for the buttons to be fitted in such a manner that the operator P has at least one of the emergency stop buttons in his field of vision inside his operating area AA. Stated differently, at least one button is not concealed by other machines. By way of example depicted in FIG. 2 the emergency stop button B1 on the machine M1 is in the field of view of the operator P, whereas the button B2 is concealed by the machine M1. Notably, in certain embodiments the emergency stop buttons are disposed within the plant but detached from the machine or machines.

Figure 3:
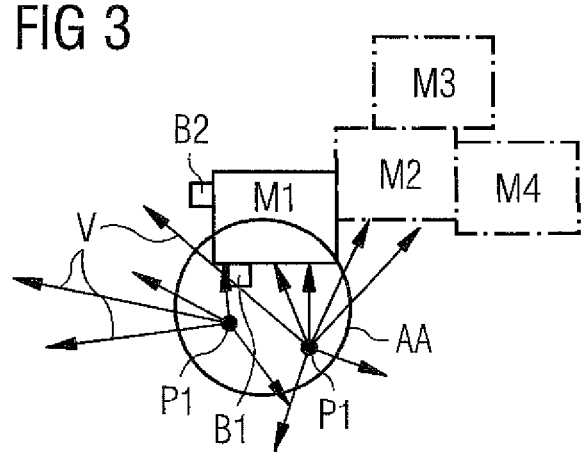
FIG. 3 shows the exemplary arrangement depicting viewing angles of the observer from two potential viewpoints.
Figure 4:
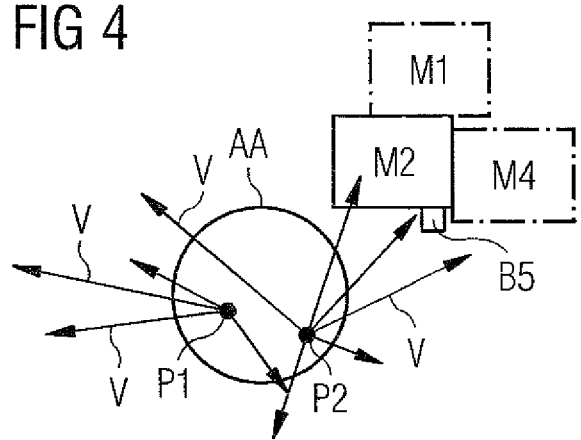
FIGS. 4 to 6 show results of determining effective region(s) for individual machines.
Figure 5:
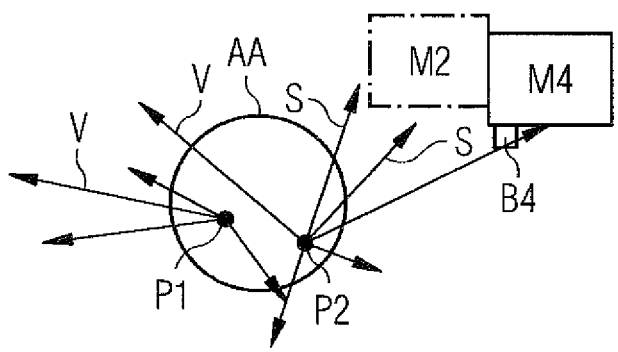
Figure 6:
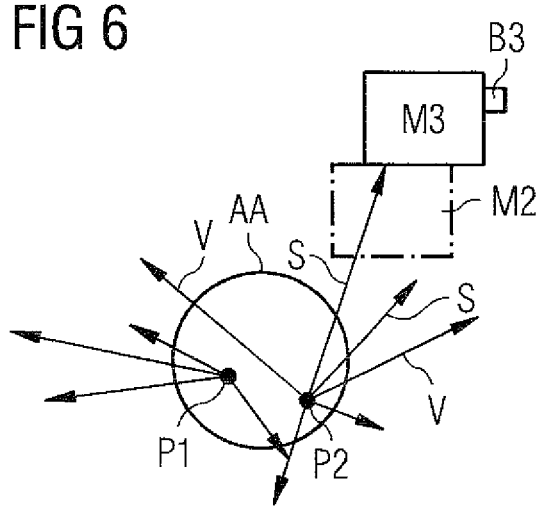

In FIG. 3, the arrows are used to symbolize which areas of the machine M1 are in the field of view of an operator P1 from two potential points of view within the operating area AA. It is discernible that in addition to M1, machines M2 and M4 are likewise in the person's field of view. In contrast, machine M3 is completely concealed by other machines.

Figure 10:
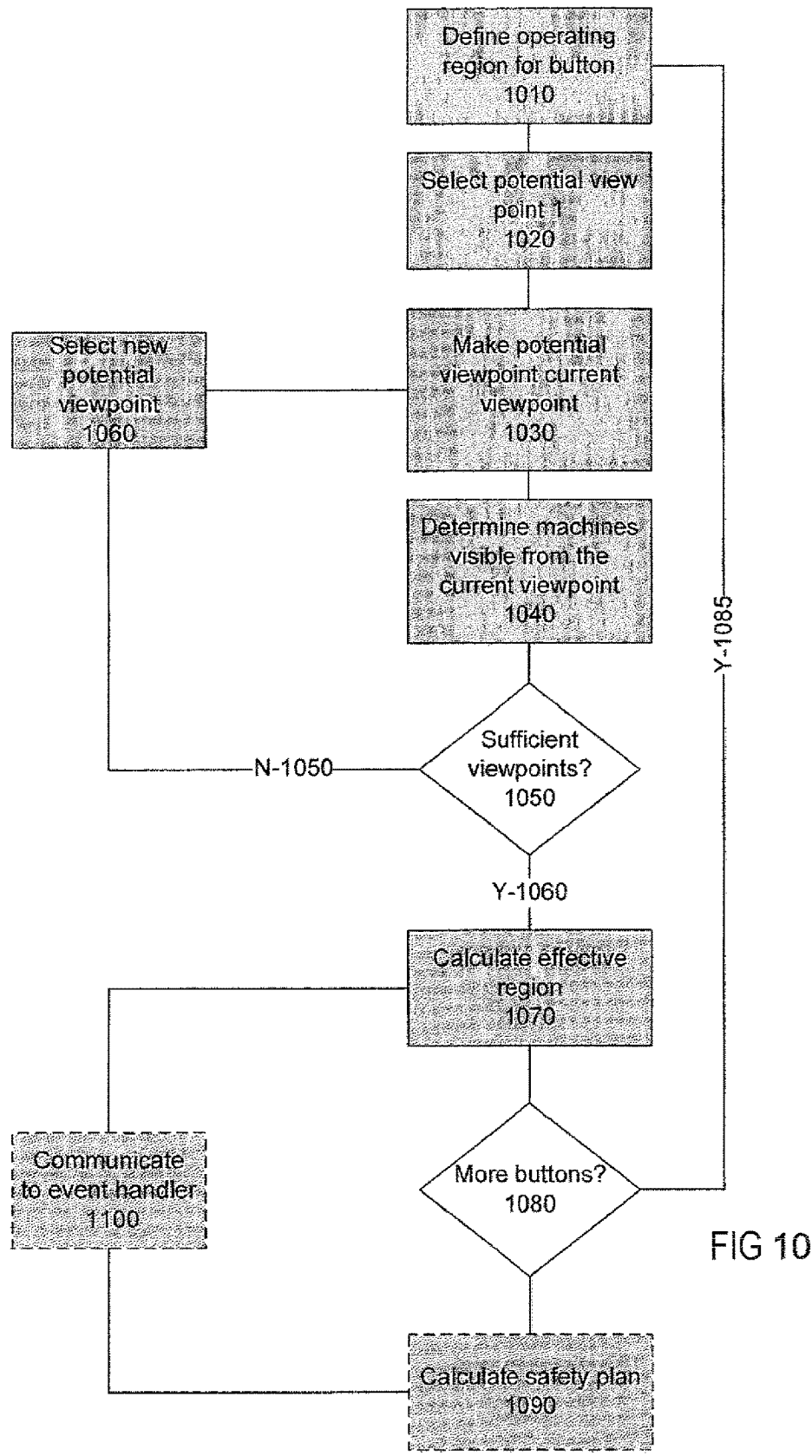
FIG. 10 shows a simplified flow diagram showing an exemplary process for determining an effective region.

Specifically, by way of example and with reference to FIG. 10, for an emergency button B1 affixed to machine M1 the following steps are carried out in a first embodiment with a decentralized solution:

Step 1: Determine 1010 an operating region AA for B1 where operating personnel P may be situated. It is noted that while the parameter of the operating region may be previously determined, the region itself may change as the button location and/or orientation changes.

Step 2: Select 1020 a potential view point in the operating region AA. This viewpoint becomes 1030 the current viewpoint.

Step 3: Using a ray casting or ray tracing method (both ray tracing and ray casting methods are known and well developed in the art of 3D graphics, and the terms shall be used interchangeably), machine M1 calculates which sections in the plant are not concealed by M1, to the operating personnel P from the current viewpoint. Stated differently, the regions in the plant which are not concealed by machine M1 are determined by simulating emission of rays to determine 1040 the concealment or visibility in the plant space, of three-dimensional objects from a particular point, namely the current viewpoint in the operating region.

Step 4: M1 transmits the determined information (for example the vector of the rays used, that is to say starting coordinates and direction) to all other machines M2 to Mn. These ray vectors emanate from the current viewpoint.

Step 5: Since machine Mx (x=2 to n) knows its own position and has access to the 3D model of the plant space, it can now calculate whether it would have been impacted by the respective rays. Mx marks certain rays as "shaded by Mx" and "originating from operating button B1" and transmits this information to all other installation parts.

Step 6: Step 5 is carried out for each of the machines from x=2 to x=n.

Step 7: Each machine can now calculate, on the basis of the information received from the other machines, whether it is visible from the current viewpoint in operating region AA or is concealed (or shaded) by another machine. The calculation can be carried out, for example, by using the set of rays "shaded by Mx and originating from the current viewpoint" minus the rays which are labeled as "shaded by My", where y=2 to n, without x. Thus the rays which arrive at Mx without being shaded by other machines is determined. When the result now reveals a sufficiently large number of impinging rays and a sufficiently large area is labeled as "visible", Mx considers itself to be "visible from at least the current viewpoint in operating area AA" and accordingly reports this to M1.

Step 8: Steps 2 to 7 are repeated 1050-1060 for sufficient number of potential viewpoints in the operating region, as required to conclude 1070 which machines are visible from the operating area of the relevant emergency stop button.

Steps 1-8 may now be repeated 1085 for each emergency stop button, to dynamically determine visible respective effective areas and machines from respective operating areas. The result may provide a safety plan for the plant. Optionally, a safety plan may be computed 1090 or manually revised to determine effective areas common to specific buttons, to determine the need for additional operating areas and buttons, and/or to determine other interdependencies between emergency stop buttons and affected machines, such as determining a plurality of machines being stopped in response to each button, and the like.

The criteria for defining when an object is considered visible, the number and disposition of viewpoints required to provide sufficient coverage from an operation region, and the like, may be set according to local regulations, applicable standards, design parameters, and the like. By way example, an object may be labeled as visible as soon as more than 10% of its outer surface is visible.

It is noted that in certain embodiments the relevant emergency stop button is not necessarily physically affixed to any machine, but may be disposed remotely to the machine, as long as the machine has knowledge of its location and orientation relative to its own, and the button has an effective sight of at least one of the machines associated therewith.

Certain necessary calculations may also be transferred, possibly also partially, to further computing units. This is advantageous, in particular, when the machines themselves lack the necessary computing capacity.

In another embodiment of the invention, the calculation is carried out in a central approach.

The following steps are carried out for each emergency stop button B1 . . . Bm:

1a. A local operating region around the emergency stop button Bx (operating region AA, x=1 to m) is determined 1010. Operating personnel P1, P2 will presumably stay in this operating region AA when a situation which makes it necessary to actuate the emergency stop button is observed. The maximum distance between the operating personnel and the emergency stop button can be preset as described supra. These operating regions do not contain any areas which cannot be entered by persons.

1b. An eye level and a maximum visual range of (preferably average) operating personnel are stipulated 1020, 1030, 1050, 1060 to define a sufficient number of points in the operating region.

1c. The system calculates 1040 the direct line of sight/ visual axis from each of sufficiently large number of points in the operating region using the previously stipulated 3D model and a ray casting, ray tracing, or another known concealment calculation algorithm.

1d. The following steps are carried out for each machine M1 to Mn:
 Calculate the area which is affected by the visual axis (visible area). Ray trace: combine the rays which impact the machines.
 When the visible area (ray trace: the number of rays) exceeds a (previously) determined portion of the surface of the machine model, this machine is marked as "visible" and the mechanisms and functions which are inherent to the machine and are necessary for transition thereof to a safe state are marked as "necessary".

1e. The set of all machines marked as "visible" from the operating region becomes the result for the emergency stop button Bx. The auxiliary functions required must not be switched off.

2. The result becomes the effective region which is calculated 1070 for each emergency stop button.

A set of auxiliary functions and/or backup machinery which should not be shut down when an emergency button is activated may also be created. By way of example such functions may include maintaining cooling, lubrication, pressures and the like. Such functions may be required to prevent damage or maintain operability of the machines, prevent higher risk than the immediate failure (such as to prevent parts falling from a conveyor belt), or facilitate a restart without increasing risk.

3. Optionally, when the effective regions and associated calculations have been carried out for each emergency stop button, the results may be implemented in the system, for example by adding calls of the suitable safety functions to an event control function 1100 (event handler 1120) for emergency stop button activation, rerouting stop command communications, and the like.

Figure 11:
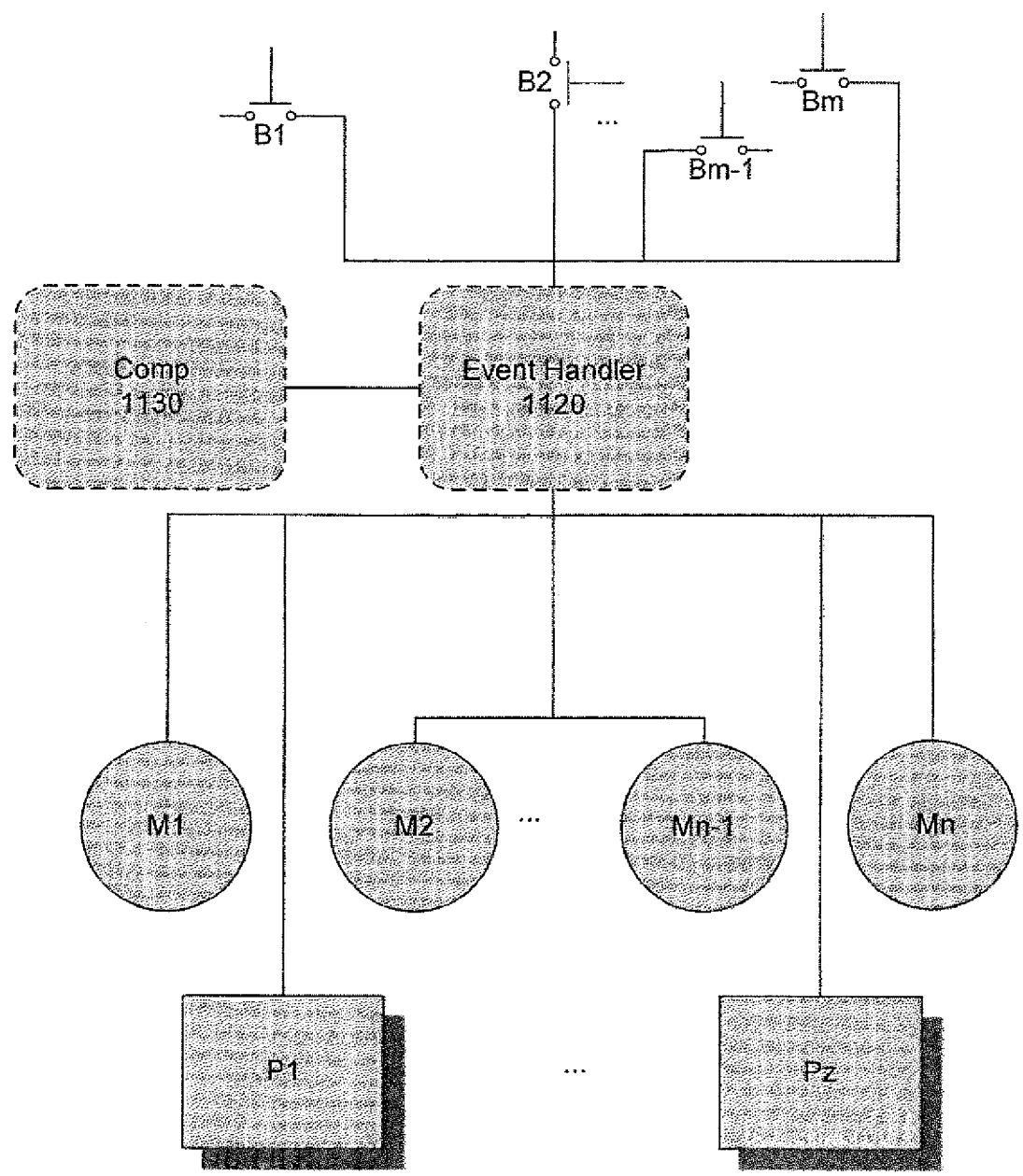
FIG. 11 shows a simplified diagram of symbolic arrangement of a plant showing various options of the plant.

FIG. 11 depicts a simplified control diagram showing a plurality of emergency stop devices B1-Bx, coupled to an event handler 1120, which in turn controls certain operations of a plurality of machines denoted in the example as M1 . . . Mx, and/or a plurality of processes. At least one of the functions of the event handler in the example is to bring any and potentially all of machines M and/or processes P to a safe state in response to an activation of at least one of the emergency stop devices P. In certain embodiments the results of computations of a safety plan or of effective areas for each of the buttons, are provided by the computing entity 1130 to the event handler 1120, to configure the event handler response to activation of an emergency stop command.

Figure 7:
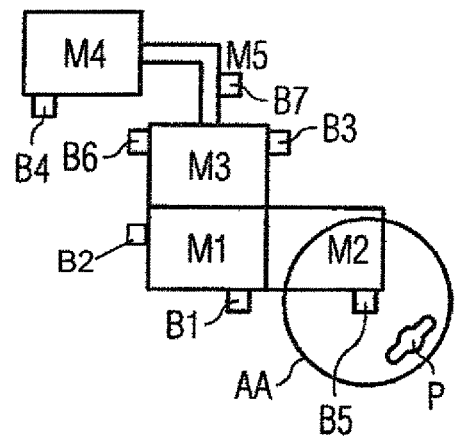
FIGS. 7 to 9 show the results of a second exemplary embodiment.

FIG. 7 shows the structure of machines M1 . . . M5 interacting with each other. The operating region (i.e. the area in which the operating personnel P can theoretically stay when an emergency situation requiring the actuation of the emergency stop button is observed) of machine M2 is indicated as AA. Emergency stop buttons B1 . . . B7 are respectively fitted to the installation parts.

Figure 8:
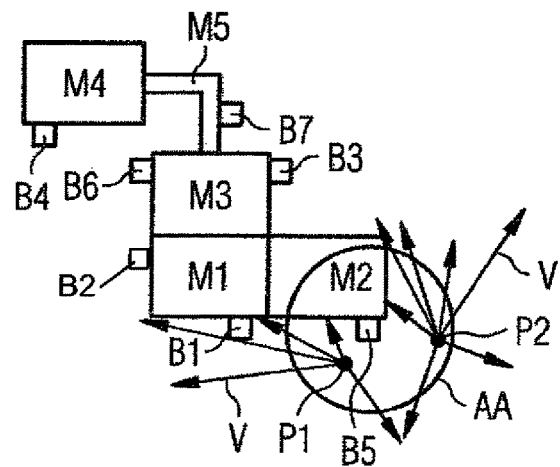

FIG. 8 illustrates how testing is carried out from the operating region AA, from viewpoints P1 and P2 by way of example, by calculating rays V by a central entity according to a ray casting or tracing method.

Figure 9:
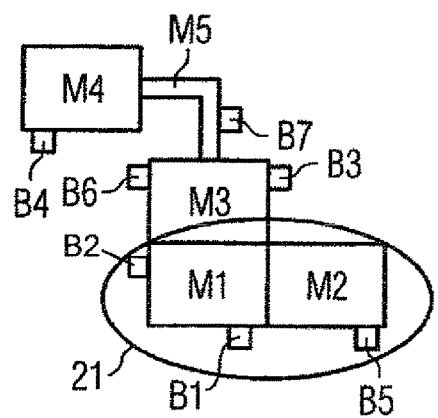

The result of the calculation is then illustrated in FIG. 9. In particular, it becomes clear that the actuation of one of the two emergency stop buttons B1 or B5 respectively comprises both machines M1 and M2 as the effective area.

In another advantageous embodiment, the calculation is carried out in a mixture of a central approach and a decentralized approach. In this case, a subordinate system may be responsible for a subset of machines, for example.

Those methods allow calculating the effective region of an emergency stop button in an automated manner. With the decentralized approach, there is no need for a further central superordinate system or a coordinator. This is particularly advantageous for use in novel cyberphysical systems.

In an optional embodiment, it is also possible to react to minor layout changes of the installation if these occur during the calculation phase. In order to keep the calculation effort as low as possible, the following procedure is proposed in order to restrict the recalculation to the necessary machine.

The plant includes the machines M1 to Mn with emergency stop buttons B1 to Bm. Assuming that the calculation of the effective regions in one of the methods described above is still in progress or has already been concluded, and changing the position or orientation of the machine Mi (i is in the range of 1 to n) is desired.

If the calculation is still in progress, it is temporarily suspended. It is then assumed (by a superordinate system which executes or controls the calculation) that the machine who's position is to be changed is itself emits light. Ray tracing, ray casting, or other visibility determination methods are now used to calculate which other machines would be impacted by light rays emanating from Mi, in a similar manner to the methods described above. If the Machine Mb is impacted, it is also assumed that this machine Mb is visible from machine Ma and vice versa. If Mb is part of the effective region, this effective region is considered invalid, and the emergency stop button is added to the list of emergency stop buttons for which the calculation of effective region has to be executed again. If machine Ma has an emergency stop button, this must also be added to the list.

The system advantageously allows manual overwriting of the automatically calculated values. In particular, an operator can define that a machine or a set of machines form a subset separate from the rest of the installation. In such case, the standards stipulate that the operating region AA is restricted to the subset of machines and is not used to increase the size of other operating regions, by way of example.

Certain embodiments also allow machines to be defined by the operator as being explicitly separated from the rest of the installation. In such cases, the effective area is restricted to the respective machine(s) according to the specifications of the standards or design parameters.

In another advantageous embodiment, the system described is used to check an existing safety plan for a plant in order to determine whether the requirements predefined by applicable standards or design parameters have been complied with.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for determining an effective region for an emergency stop device disposed in an industrial plant having a plurality of operatively coupled individual machines spatially distributed in the plant, the method utilizing a three-dimensional plant model modeling the plant or a portion thereof, and a plurality of three-dimensional machine models modeling the outer boundaries for a respective machine of the plurality of machines, said method comprising the steps of:
   a) determining an operating region for the emergency stop device;
   b) selecting a current potential viewpoint inside the operating region;
   c) utilizing a visibility determination algorithm, the plant model and at least one of the plurality of machine models, and information relating to the disposition of the machines within the plant, determining a set of machines visible from the current potential viewpoint;
   d) when a sufficient number of viewpoints has been considered by step c) in order to obtain sufficient visibility of the machines in accordance with pre-defined criteria, then continuing with step f), and otherwise determining a subsequent viewpoint inside the operating region;
   e) executing steps c) through d) with the subsequent viewpoint being used as the current potential viewpoint,
   f) determining which machines are visible from the operating region by evaluating the results from step c), and setting the effective region to those machines;
   g) adding an appropriate safety function call to an emergency stop button activation based on the results of step f), the safety function being selected from the group consisting of maintaining cooling, maintaining lubrication, maintaining pressures and rerouting stop command communications; and
   h) performing the safety function upon activation of the emergency stop button.

2. The method of claim 1, wherein at least one of the machines contains information relating to transitioning thereof to an emergency stop state.

3. The method of claim 2, wherein the information contained in the machine is selected from energy required to transition the machine to an emergency stop state, potential movement of the machine during transition thereof to an emergency stop state, at least one function permitting transitioning the machine to an emergency stop state, and any combination thereof.

4. The method of claim 1, wherein the visibility determination algorithm comprises ray casting algorithm, and or ray tracing algorithm.

5. The method of claim 1, wherein the emergency stop device is directly coupled to a machine.

6. The method of claim 5, wherein the emergency stop device is disposed within the operating region away from the machine.

7. The method of claim 1, wherein the emergency stop device is disposed remotely to a machine associated therewith.

8. The method of claim 1, wherein the method further comprises the steps of performing steps a)-f) and determining an effective region for a plurality of emergency stop devices, and combining the plurality of resulting effective regions into a plant safety plan.

9. The method of claim 8, wherein the plant safety plan is utilized to automatically configure an automatic event handler handling at least responses to activation of an emergency stop device.

10. The method of claim 9, wherein the plant safety plan is manually editable.

11. The method of claim 8, wherein the plant safety plan is manually editable.

12. The method of claim 8, wherein when a single machine disposition is changed within the plant during or after execution of any of steps a)-f), the safety plan is adjusted by calculating first the effective region of the changed machine, determining required recalculations for any of the effective regions, and recalculating only the required effective regions.

13. The method of claim 12, wherein the calculation the effective region of the changed machine utilizes a ray tracing or ray casting algorithm, the rays being cast or traced from the changed machine towards the operating region or a portion thereof.

14. The method of claim 1, wherein at least one of steps a)-f) are performed in a central superordinate computing entity of the industrial plant.

15. The method of claim 1, wherein at least one of steps a)-f) are executed in a distributed fashion by at least two of the plurality of machines, ad wherein information relating to the visibility of at least one machine from the viewpoint, is exchanged between at least two machines.

16. The method of claim 15, wherein the information relating to the visibility of at least one machine is exchanged with a computing entity outside any of the plurality of machines.

17. An industrial plant, comprising:
   a plurality of operatively coupled individual machines spatially distributed in the plant;
   a plurality of emergency stop devices;
   a data memory including at least a three-dimensional plant model modeling the plant or a portion thereof, and a plurality of three-dimensional machine models modeling the outer boundaries for a respective machine of the plurality of machines stored therein; and
   a computing entity having access to the memory, and configured to determine an effective region for at least one of the plurality of emergency stop device by executing at least the following:
   a) determining an operating region for the emergency stop device;
   b) selecting a current potential viewpoint inside the operating region;
   c) utilizing a visibility determination algorithm, the plant model and at least one of the plurality of machine models, and information relating to the disposition of the machines within the plant, determining a set of machines visible from the current potential viewpoint;
   d) when a sufficient number of viewpoints have been considered by step c) in order to obtain sufficient visibility of the machines in accordance with predefined criteria, then continuing execution at, and otherwise determining a subsequent viewpoint inside the operating region;
   e) executing c) through d) with the subsequent viewpoint being used as the potential viewpoint,
   f) determining which machines are visible from the operating region by evaluating the results from step b, and setting the effective region to those machines;
   g) adding an appropriate safety function call to an emergency stop button activation based on the results of step f), the safety function being selected from the group consisting of maintaining cooling, maintaining lubrication, maintaining pressures and rerouting stop command communications; and
   h) performing the safety function upon activation of the emergency stop button.

18. The plant of claim 17, wherein the computing entity is distributed between at least two sub-entities, and wherein at least one of the sub-entities is one of the plurality of machines.

19. The plant of claim 18, wherein the computing entity is further configured to a safety plan by combining information of a plurality of effective regions.

20. An apparatus for determining an effective region of an emergency stop button in a plant having a plurality of operatively coupled individual machines spatially distributed in the plant, and plurality of emergency stop devices, the apparatus comprising a data memory having at least a three-dimensional plant model modeling the plant or a portion thereof, and plurality of three-dimensional machine models modeling the outer boundaries for a respective machine of the plurality of machines stored therein; and a computing entity having access to the memory, and configured to execute at least the following;
   a) determining an operating region for the emergency stop device;
   b) selecting a current potential viewpoint inside the operating region;
   c) utilizing a visibility determination algorithm, the plant model and at least one of the plurality of machine models, and information relating to the disposition of the machines within the plant, determining a set of machines visible from the current potential viewpoint;
   d) when a sufficient number of viewpoints have been considered by step c) in order to obtain sufficient visibility of the machines in accordance with predefined criteria, then continuing execution at, and otherwise determining a subsequent viewpoint inside the operating region;
   e) executing c) through d) with the subsequent viewpoint being used as the potential viewpoint,
   f) determining which machines are visible from the operating region by evaluating the results from step b, and setting the effective region to those machines;
   g) adding an appropriate safety function call to an emergency stop button activation based on the results of step f), the safety function being selected from the group consisting of maintaining cooling, maintaining lubrication, maintaining pressures and rerouting stop command communications; and
   h) performing the safety function upon activation of the emergency stop button.

* * * * *